(12) United States Patent
Huang et al.

(10) Patent No.: US 11,855,506 B2
(45) Date of Patent: Dec. 26, 2023

(54) BASE ASSEMBLY OF VOICE COIL MOTOR AND VOICE COIL MOTOR

(71) Applicant: Lanto Electronic Limited, Kunshan (CN)

(72) Inventors: Wen-Yen Huang, Taipei (TW); Fu-Yuan Wu, Taipei (TW); Shang-Yu Hsu, Taipei (TW); Meng-Ting Lin, Taipei (TW); BingBing Ma, Kunshan (CN); Jie Du, Kunshan (CN); Yu-Cheng Lin, Taipei (TW)

(73) Assignee: Lanto Electronic Limited, Kunshan (CN)

( * ) Notice: Subject to any disclaimer, the term of this patent is extended or adjusted under 35 U.S.C. 154(b) by 5 days.

(21) Appl. No.: 17/513,286

(22) Filed: Oct. 28, 2021

(65) Prior Publication Data
US 2022/0247299 A1 Aug. 4, 2022

(30) Foreign Application Priority Data
Feb. 4, 2021 (CN) .......................... 202120320829.5

(51) Int. Cl.
*H02K 41/03* (2006.01)
*H02K 41/035* (2006.01)
*G02B 27/64* (2006.01)

(52) U.S. Cl.
CPC ....... *H02K 41/0356* (2013.01); *G02B 27/646* (2013.01)

(58) Field of Classification Search
CPC ...... H02K 41/00; H02K 41/03; H02K 41/035; H02K 41/0354; H02K 41/0356; H02K 5/00; H02K 5/24; H02K 33/00; H02K 33/02; H02K 33/18; G03B 13/00; G03B 13/34; G03B 13/035; G03B 13/36; G02B 7/00; G02B 7/04; G02B 7/09; G02B 7/10
See application file for complete search history.

(56) References Cited

U.S. PATENT DOCUMENTS

2017/0176707 A1* 6/2017 Park .................... G02B 7/04
2018/0338069 A1* 11/2018 Hu ...................... H04N 23/55

FOREIGN PATENT DOCUMENTS

| CN | 205702878 | * 11/2016 |
| CN | 110119016 | * 8/2019 |

* cited by examiner

*Primary Examiner* — Tran N Nguyen
(74) *Attorney, Agent, or Firm* — Birch, Stewart, Kolasch & Birch, LLP

(57) ABSTRACT

The present disclosure provides a base assembly of voice coil motor and a voice coil motor. The base assembly includes a base body having an elastic piece connecting area with a protrusion; a lower elastic piece disposed on the elastic piece connecting area with a first connecting hole, a second connecting hole, and a first trench, the protrusion is exposed from the first connecting hole, and the first trench is disposed between the first connecting hole and the second connecting hole; a connecting piece; and a terminal having a conductive part and a terminal connecting part, wherein the conductive part is disposed in the base body, the terminal connecting part passes through the elastic piece connecting area and protrudes from the elastic piece connecting area, and a part of the terminal connecting part is exposed from the second connecting hole to be fixedly connected to the lower elastic piece.

17 Claims, 16 Drawing Sheets

BASE ASSEMBLY OF VOICE COIL MOTOR AND VOICE COIL MOTOR

CROSS REFERENCE TO RELATED DISCLOSURE

This application claims the priority benefit of Chinese Patent Application Number CN202120320829.5, filed on Feb. 4, 2021, the full disclosure of which is incorporated herein by reference.

BACKGROUND

Technical Field

The present disclosure relates to the technical field of voice coil motor, particularly to a base assembly of voice coil motor and a voice coil motor.

Related Art

The present voice coil motor generally has an upper elastic piece and a lower elastic piece. The lower elastic piece is taken as an example, the lower elastic piece has an elastic piece part and a connecting part. Wherein, the elastic piece part is connected to an elastic piece connecting area of a base assembly, and the connecting part is connected to the lens inside the voice coil motor. In this way, the lower elastic piece may stabilize the lens on the move through the connecting part.

FIGS. 1 to 3 respectively are a schematic diagram of the base assembly and an enlarged exploded diagram and an enlarged schematic diagram of the area A in FIG. 1 of the voice coil motor in the prior art. As shown in the figures, a lower elastic piece P1 is usually fixed on an elastic piece connecting area P2 by welding and riveting. More specifically, the lower elastic piece P1 is connected to a terminal P3 protruding from the elastic piece connecting area P2 by welding and is fixed to a protrusion P20 of the elastic piece connecting area P2 by a riveting piece P4.

As shown in FIG. 2, in order to make the welding of the lower elastic piece P1 and the terminal P3 more stable, the terminal P3 is generally obviously protruded from the elastic piece connecting area P2 (that is, a height H is generated). However, the obviously protruding terminal P3 causes a contact area A1 of the lower elastic piece P1 and the terminal P3 in FIG. 3 to protrude, resulting in an obvious gap existing between the lower elastic piece P1 and the elastic piece connecting area P2. In addition, due to the high hardness of the lower elastic piece P1, even if the lower elastic piece P1 is pressed against by the riveting piece P4, a gap in a riveted area A2 is difficult to eliminate. In some products, when the terminal P3 protrudes from the elastic piece connecting area P2 by about 0.15 mm (that is, the height H is 0.15 mm), a gap of about 0.015 mm exists between the lower elastic piece P1 of the riveted area A2 and the elastic piece connecting area P2. The precision of the voice coil motor is reduced by the gap.

SUMMARY

The embodiments of the present disclosure disclose a base assembly of a voice coil motor and a voice coil motor, in order to solve the problem of poor precision of the voice coil motor due to an obvious gap between the lower elastic piece and the connecting area of the elastic piece.

In order to solve the above technical problems, the present disclosure is implemented as follows.

In the first aspect, the present disclosure provides a base assembly of a voice coil motor, including a base body, a lower elastic piece, a connecting piece, and a terminal. The base body has an elastic piece connecting area. The elastic piece connecting area has a protrusion. The lower elastic piece disposed on the elastic piece connecting area. The lower elastic piece has a first connecting hole, a second connecting hole, and a first trench. The protrusion is exposed from the first connecting hole. The first trench is disposed between the first connecting hole and the second connecting hole. The connecting piece is connected to the protrusion and is contacted with the lower elastic piece. The terminal has a conductive part and a terminal connecting part. The conductive part is disposed in the base body. The terminal connecting part passes through the elastic piece connecting area and protrudes from the elastic piece connecting area. A part of the terminal connecting part is exposed from the second connecting hole to be fixedly connected to the lower elastic piece.

In the second aspect, the present disclosure provides a voice coil motor including the base assembly mentioned as the first aspect and a coil assembly. The coil assembly is disposed on the base assembly and includes a magnet, a conductive pillar, a frame, a coil, and an upper elastic piece. The magnet is disposed on the elastic piece connecting area. The conductive pillar is electrically connected to the lower elastic piece. The frame is disposed on the base body, and the frame is recessed to form an annular groove. The coil disposed in the annular groove, and the coil is also electrically connected to the coil body. The upper elastic piece is disposed on the frame.

In the embodiment of the present disclosure, the lower elastic piece has a first trench, and an area of the lower elastic piece may be reduced by the first trench. In material mechanics, the rigidity of the element is determined by the size of the area thereof. In other words, a decrease in the area of the lower elastic piece represents a decrease in the rigidity of the lower elastic piece. In this way, when the connecting piece is pressed against the lower elastic piece, a gap area and a gap distance between the lower elastic piece and the connecting area of the elastic piece are further reduced, therefore the precision of the coil motor is improved.

BRIEF DESCRIPTION OF THE DRAWINGS

The Figures described herein are used to provide a further understanding of the present disclosure and constitute a part of the present disclosure. The exemplary embodiments and descriptions of the present disclosure are used to illustrate the present disclosure and do not limit the present disclosure, in which.

DETAILED DESCRIPTION OF THE EMBODIMENTS

In order to make the objectives, technical solutions, and advantages of the present disclosure clearer, the technical solutions of the present disclosure will be described clearly and completely in conjunction with specific embodiments and the Figures of the present disclosure. Obviously, the described embodiments are only a part of the embodiments of the present disclosure, rather than all the embodiments. Based on the embodiments in the present disclosure, all other embodiments obtained by a person of ordinary skill in the art without creative work fall within the protection scope of this disclosure.

The following description is of the best-contemplated mode of carrying out the present disclosure. This description is made for the purpose of illustrating the general principles of the present disclosure and should not be taken in a limiting sense. The scope of the present disclosure is best determined by reference to the appended claims.

Moreover, the terms "include", "contain", and any variation thereof are intended to cover a non-exclusive inclusion. Therefore, a process, method, object, or device that comprises a series of elements not only includes these elements, but also comprises other elements not specified expressly, or may include inherent elements of the process, method, object, or device. If no more limitations are made, an element limited by "include a/an . . . " does not exclude other same elements existing in the process, the method, the article, or the device which comprises the element.

Figure 1:
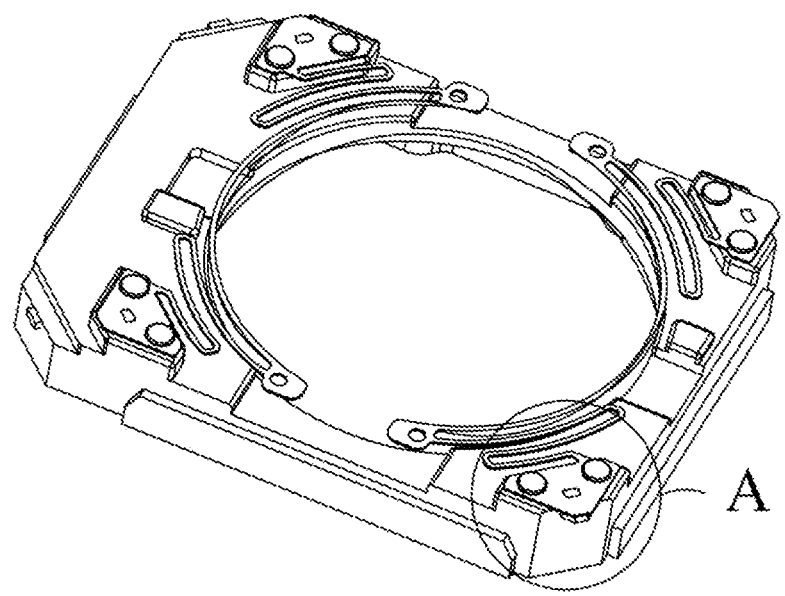
FIG. 1 is a schematic diagram of the base assembly of the voice coil motor in the prior art.
Figure 2:
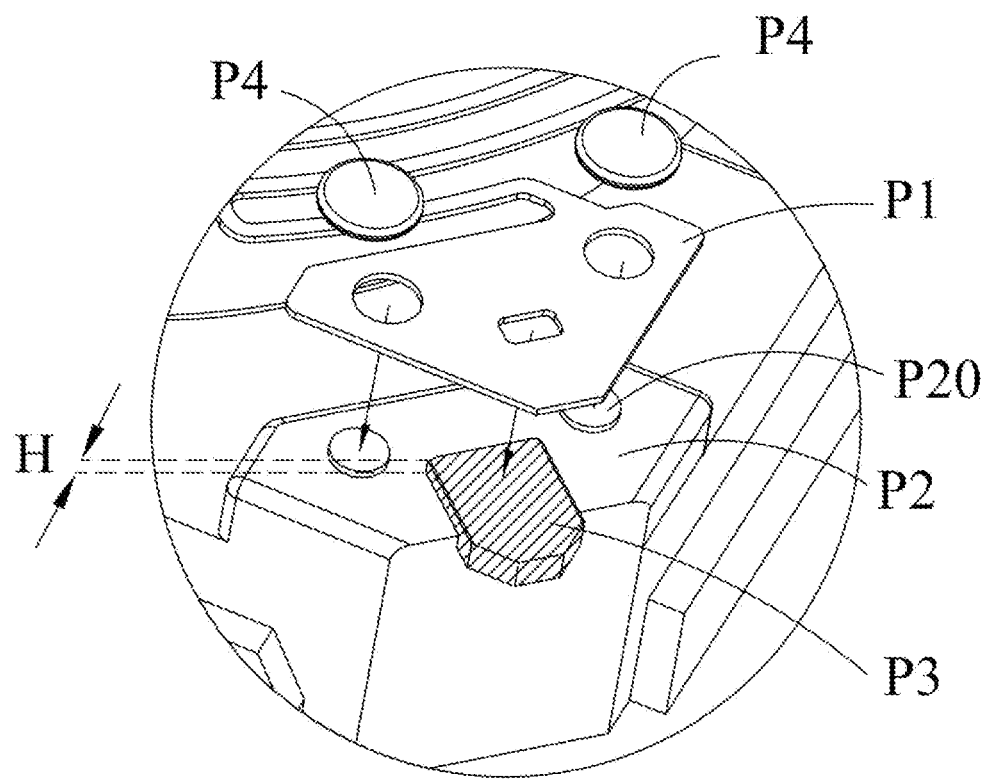
FIG. 2 is an enlarged diagram of the area A in FIG. 1.
Figure 3:
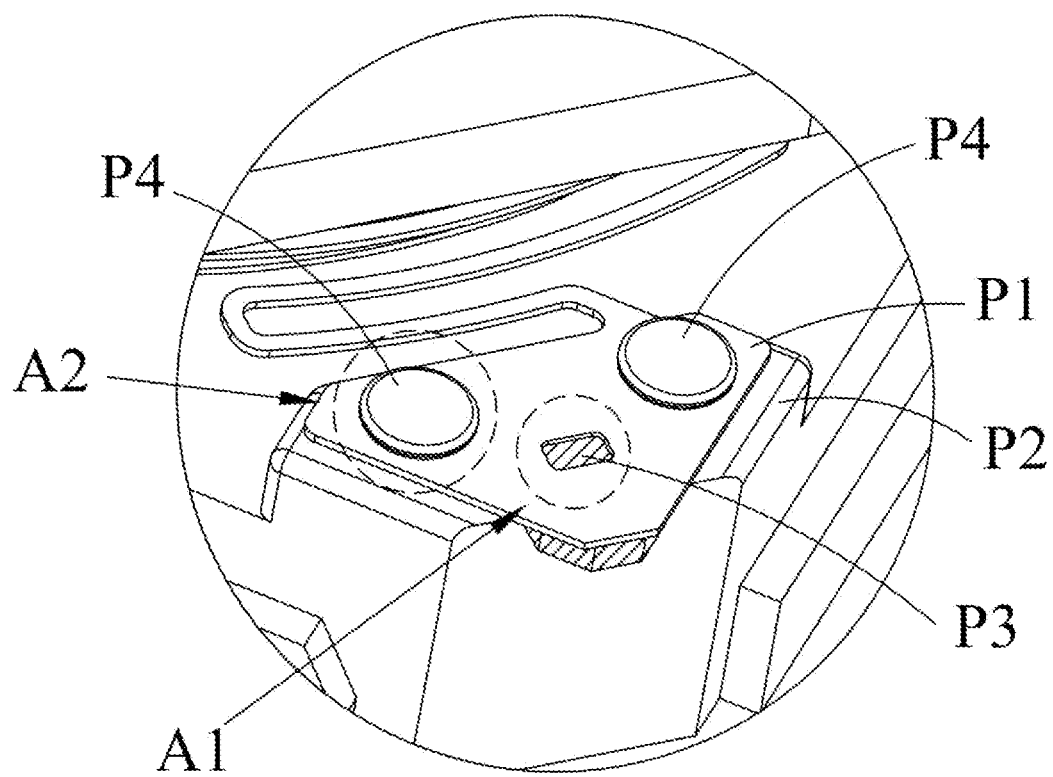
FIG. 3 is an enlarged schematic diagram of area A in FIG. 1.
Figure 4:
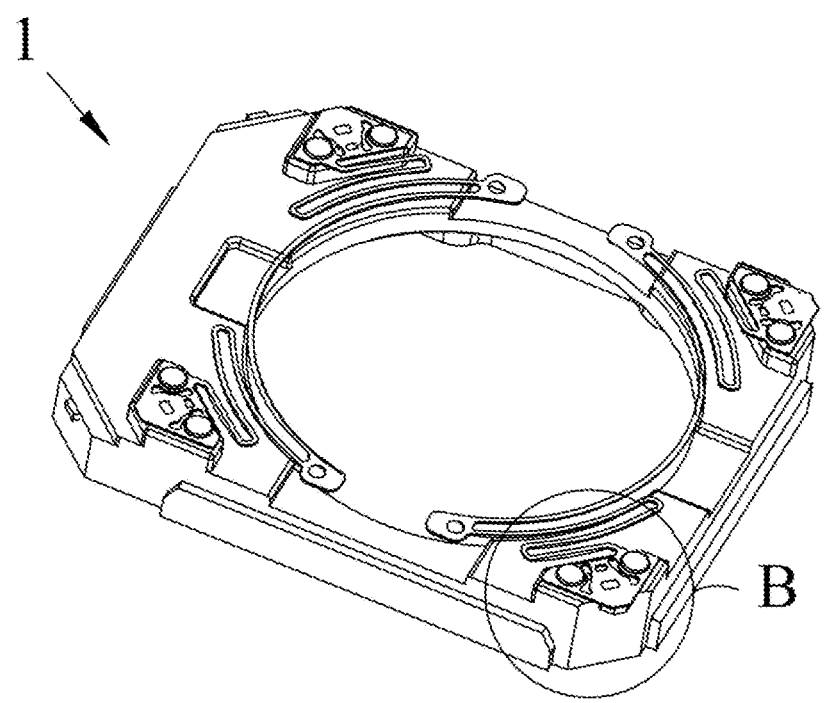
FIG. 4 is a schematic diagram of the base assembly according to an embodiment of the present disclosure.
Figure 5:
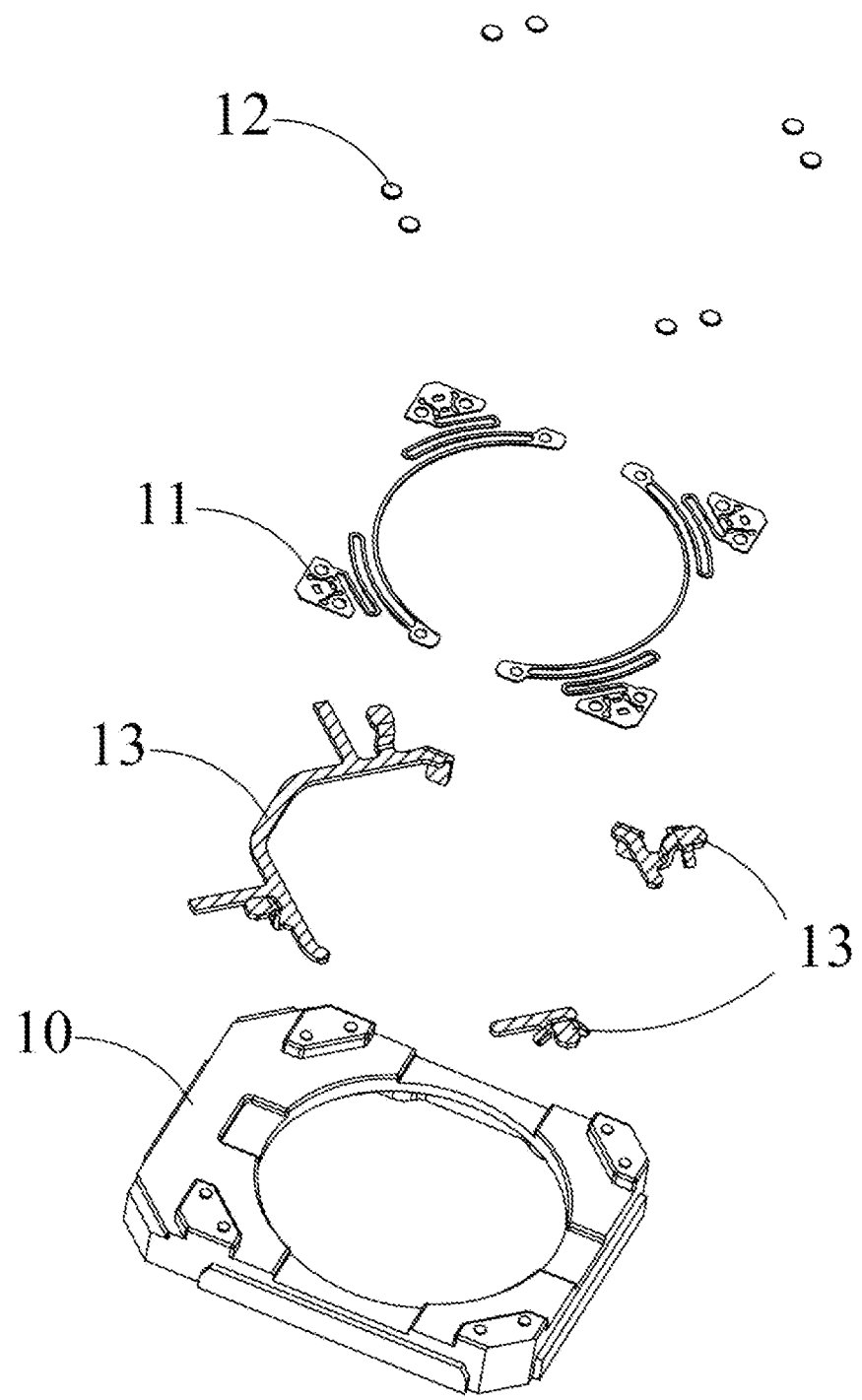
FIG. 5 is an exploded diagram of the base assembly according to an embodiment of the present disclosure.

FIGS. 4 to 9 are respectively a schematic diagram and an exploded diagram of the base assembly, an enlarged schematic diagram of the area B in FIG. 4, a schematic diagram of the base body, a schematic diagram of the lower elastic piece, and a schematic diagram of the terminal of the voice coil motor according to an embodiment of the present disclosure. As shown in the figures, the base assembly 1 of the voice coil motor includes a base body 10, a lower elastic piece 11, a connecting piece 12, and a terminal 13. The base body 10 has an elastic piece connecting area 100. The elastic piece connecting area 100 has a protrusion 101. The lower elastic piece 11 is disposed on the elastic piece connecting area 100. The lower elastic piece 11 has a first connecting hole 110, a second connecting hole 111, and a first trench 112. The protrusion 101 is exposed from the first connecting hole 110. The protrusion 101 passes through the first connecting hole 110. The first trench 112 is disposed between the first connecting hole 110 and the second connecting hole 111. The connecting piece 12 is disposed on the protrusion 101 exposed from the first connecting hole 110, and a middle part of the connecting piece 12 is connected to the protrusion 101. A surrounding part of the connecting piece 12 is contacted with and presses against a part of the lower elastic piece 11 around the first connecting hole 110. The terminal 13 has a conductive part 130 and a terminal connecting part 131. The conductive part 130 is disposed in the base body 10. The terminal connecting part 131 passes through the elastic piece connecting area 100 and protrudes from the elastic piece connecting area 100. A part of the terminal connecting part 131 is exposed from the second connecting hole 111 to be fixedly connected to the lower elastic piece 11.

In the present disclosure, the lower elastic piece 11 is connected to the base body 10 and the terminal 13 through the first connecting hole 110 and the second connecting hole 111, respectively. In addition, in order to make the connecting between the lower elastic piece 11 and the base body 10 and the connecting between the lower elastic piece 11 and the terminal 13 more stable, the lower elastic piece 11 is further provided with the first trench 112. Therefore, in order to make the technical features of the disclosure more clear, the connecting method between the lower elastic piece 11 and the terminal 13, the connecting method between the lower elastic piece 11 and the base body 10, and the effect of the lower elastic piece 11 provided with the first trench 112 is respectively described hereinafter.

In some embodiments, the terminal connecting part 131 may fixedly be connected to the lower elastic piece 11 by soldering/welding. For example, the terminal connecting part 131 and the lower elastic piece 11 may be fixedly connected by an adhesive containing metal. Alternatively, the lower elastic piece 11 and the terminal connecting part 131 may also be directly heated so that the materials thereof melt and diffuse into each other. Therefore, the lower elastic piece 11 and the terminal connecting part 131 are fixed to each other. Since electrical connecting between the terminal connecting part 131 and the lower elastic piece 11 is necessary (it will be described in detail hereinafter), the size of the second connecting hole 111 may be adjusted according to soldering/welding requirements. Specifically, the larger the size of the second connecting hole 111, the larger space for soldering/welding (better fixing effect), but the overlapping area of the terminal connecting part 131 and the lower elastic piece 11 decreases (the resistivity increases). Conversely, the smaller the size of the second connecting hole 111, the smaller space for soldering/welding (more difficult to fix), but the overlapping area of the terminal connecting part 131 and the lower elastic piece 11 increases (the resistivity decreases).

In some embodiments, the connecting piece 12 may be a rivet or an element with similar or identical functions to the rivet. The rivet may be disposed on the protrusion 101 of the elastic piece connecting area 100 by a hot riveting process. For example, firstly, the lower elastic piece 11 is placed on the elastic piece connecting area 100. Wherein, the protrusion 101 of the elastic piece connecting area 100 is exposed (or penetrated) by the first connecting hole 110 of the lower elastic piece 11, and a part of the terminal connecting part 131 is exposed by the second connecting hole 111 of the lower elastic piece 11. Then, the connecting piece 12 is placed on the protrusion 101 exposed by the first connecting hole 110 of the lower elastic piece 11. Finally, the connecting piece 12 is pressed against the lower elastic piece 11 by a hot riveting machine and fixedly connected to the protrusion 101, so that two sides of the lower elastic piece 11 (that is, an area adjacent to the connecting piece 12) may be steadily attached on the elastic piece connecting area 100. In some embodiments, the connecting piece 12 and the protrusion 101 may be a long cylindrical integrated at an initial state, and the long cylindrical passes upward through the first connecting hole 110 from the elastic piece connecting area 100 and is higher than the lower elastic piece 11. When the lower elastic piece 11 is connected to the elastic piece connecting area 100 by the hot riveting process, the long cylinder may be compressed and deformed by a hot press head toward the lower elastic piece 11 to form the rivet-shaped connecting piece 12 and the protrusion 101.

Figure 10:
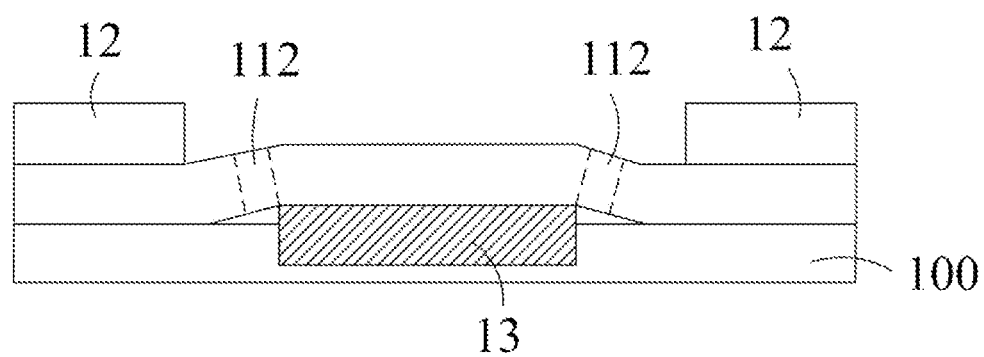
FIG. 10 is a schematic diagram of the cross-section of the base assembly according to an embodiment of the present disclosure.

As mentioned above, the lower elastic piece 11 with the first trench 112 may have a relatively high degree of bending (or its rigidity is relatively low). FIG. 10 is a schematic diagram of a cross-section of the base assembly according to an embodiment of the present disclosure. As shown in the figure, as the rigidity of the lower elastic piece 11 decreases, a gap between the lower elastic piece 11 and the elastic piece connecting area 100 may be reduced through the pressing of the connecting piece 12. Furthermore, the smaller the gap between the lower elastic piece 11 and the elastic piece connecting area 100 is, the lower elastic piece 11 may be more stably disposed on the elastic piece connecting area 100. Therefore, the vibration of the lower elastic piece 11 with respect to the elastic piece connecting area 100 is reduced. In other words, the precision of the voice coil motor may be improved through the disposal of the first trench 112, therefore the problems in the prior art are solved.

The rigidity of the lower elastic piece 11 is determined by an area of thrust surface (that is, the partial area or the total area of the lower elastic piece 11). Therefore, in some embodiments, the size of the first trench 112 may be adjusted according to the actual situation, so that the lower elastic piece 11 has different rigidity. For example, when the terminal connecting part 131 is more protruding with respect to the elastic piece connecting area 100, a first trench 112 may be disposed. Therefore, the lower elastic piece 11 may more easily be bent. In addition, when the lower elastic piece 11 is made of a material with higher hardness (for example, steel with higher hardness than copper and aluminum is used as the material), a larger first trench 112 may also be disposed. Therefore, the lower elastic piece 11 may more easily be bent. In this way, the lower elastic piece 11 may be attached to the elastic piece connecting area 100 by the connecting piece 12 to a greater extent.

Figure 6:
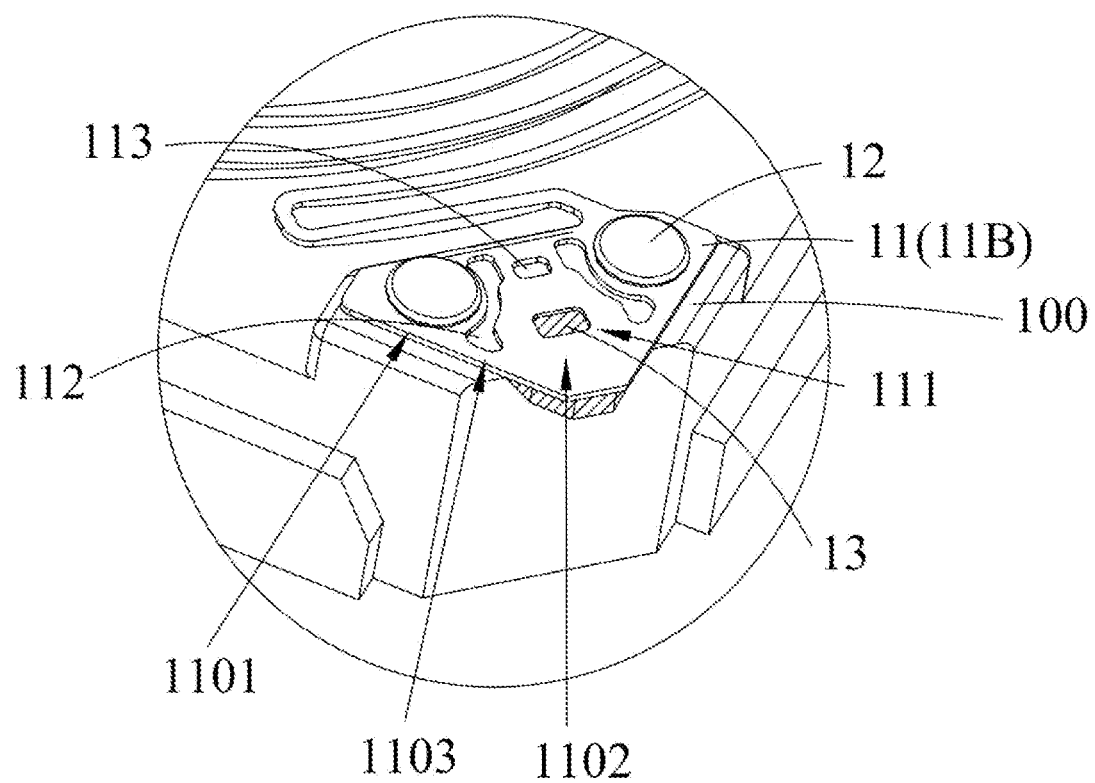
FIG. 6 is an enlarged schematic diagram of the area B in FIG. 4.
Figure 8:
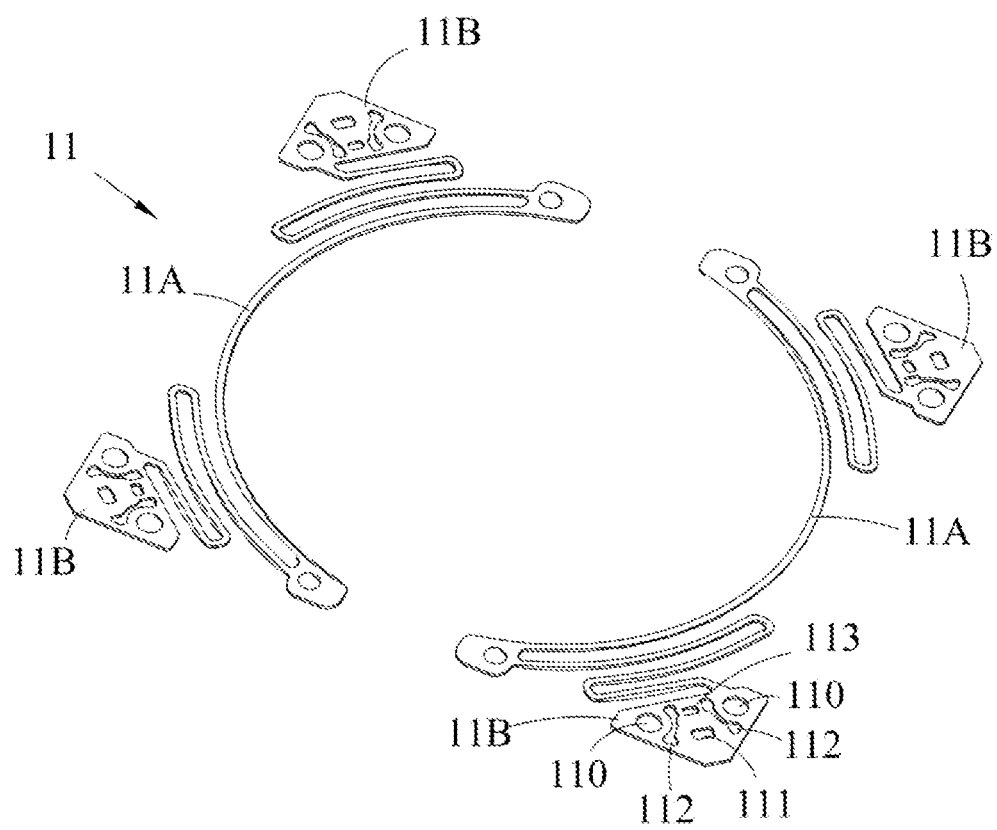
FIG. 8 is a schematic diagram of the lower elastic piece according to an embodiment of the present disclosure.

As shown in FIG. 8, the lower elastic piece 11 includes an elastic piece connecting part 11A and a lower elastic piece part 11B at one end of the elastic piece connecting part 11A. As shown in FIG. 6, FIG. 6 is an enlarged diagram of the lower elastic piece part 11B. The lower elastic piece part 11B is correspondingly disposed on the elastic piece connecting area 100, and the lower elastic piece part 11B includes a fixing portion 1101, an electrical connecting portion 1102, and a low rigidity portion 1103. The low rigidity portion 1103 is disposed between the fixing portion 1101 and the electrical connecting portion 1102. The first connecting hole 110 is disposed in the fixing portion 1101. The connecting piece 12 is pressed attached on the fixing portion 1101 so that the fixing portion 1101 is attached to the elastic piece connecting area 100. The second connecting hole 111 is disposed in the electrical connecting portion 1102. The electrical connecting portion 1102 is pushed upward by the terminal connecting part 131 and not in contact with the elastic piece connecting area 100. The first trench 112 is disposed in the low rigidity portion 1103, and the rigidity of the low rigidity portion 1103 may be reduced by the first trench 112. For example, a connecting area between the fixing portion 1101 and the electrical connecting portion 1102 is reduced by the first trench 112, and the low rigidity portion 1103 with a lower rigidity is formed from the reduced connecting area. The lower rigidity of the situation mentioned above is with respect to the situation that the fixing portion 1101 and the electrical connecting portion 1102 are not provided with the first trench 112. Greater bending may be allowed by the low rigidity portion 1103, so that the fixing portion 1101 may better attach to the elastic piece connecting area 100 (as shown in FIG. 10).

In addition, the lower elastic piece 11 may also include a second trench 113 (as shown in FIG. 8), and the second trench 113 is disposed on a side of the second connecting hole 111 close to the center of the base body 10. The second trench 113 has a function similar to or the same as the function of the first trench 112. That is, the function is about reducing the rigidity of the lower elastic piece 11. Therefore, in actual usage, the second trenches 113 of different sizes may also be disposed according to requirements. In addition, compared to the second trench 113 is not disposed, the lower elastic piece 11 after riveting and soldering/welding may be prevented from bulging at this position when the second trench 113 is disposed.

In some embodiments, the shape of the first connecting hole 110 is circular, and the shape of the first trench 112 is an arc extending along the first connecting hole 110. However, the present disclosure is not limited thereto. For example, the shape of the first trench 112 may also be a polygon extending along the first connecting hole 110 or a special shape.

Figure 11:
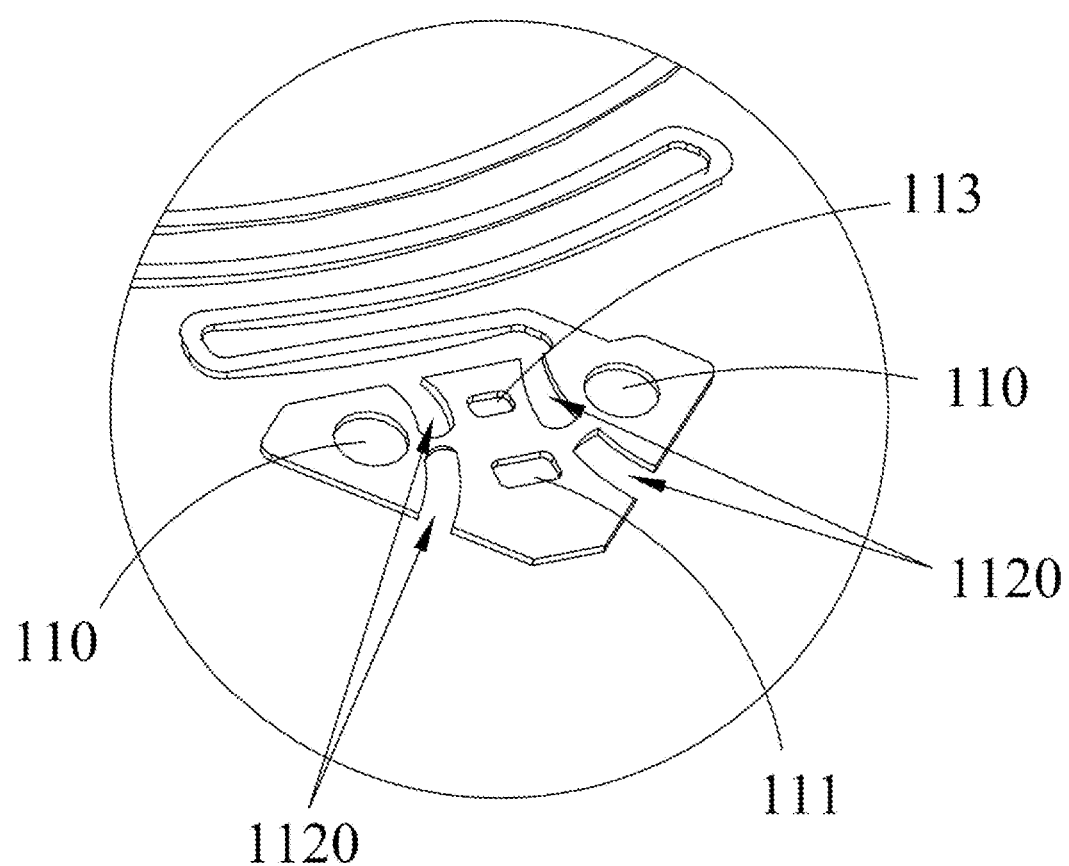
FIG. 11 is a schematic diagram of the lower elastic piece according to another embodiment of the present disclosure.

FIG. 11 is a schematic diagram of a lower elastic piece according to another embodiment of the present disclosure. As shown in the figure, in some embodiments, the first trench 112 may include two first sub-trenches 1120, and one ends of the two first sub-trenches 1120 respectively pass through a sidewall of the lower elastic piece 11. In other words, the effect of reducing the rigidity of the lower elastic piece 11 may also be achieved through the two first sub-trenches 1120 shown in FIG. 11.

Figure 12:
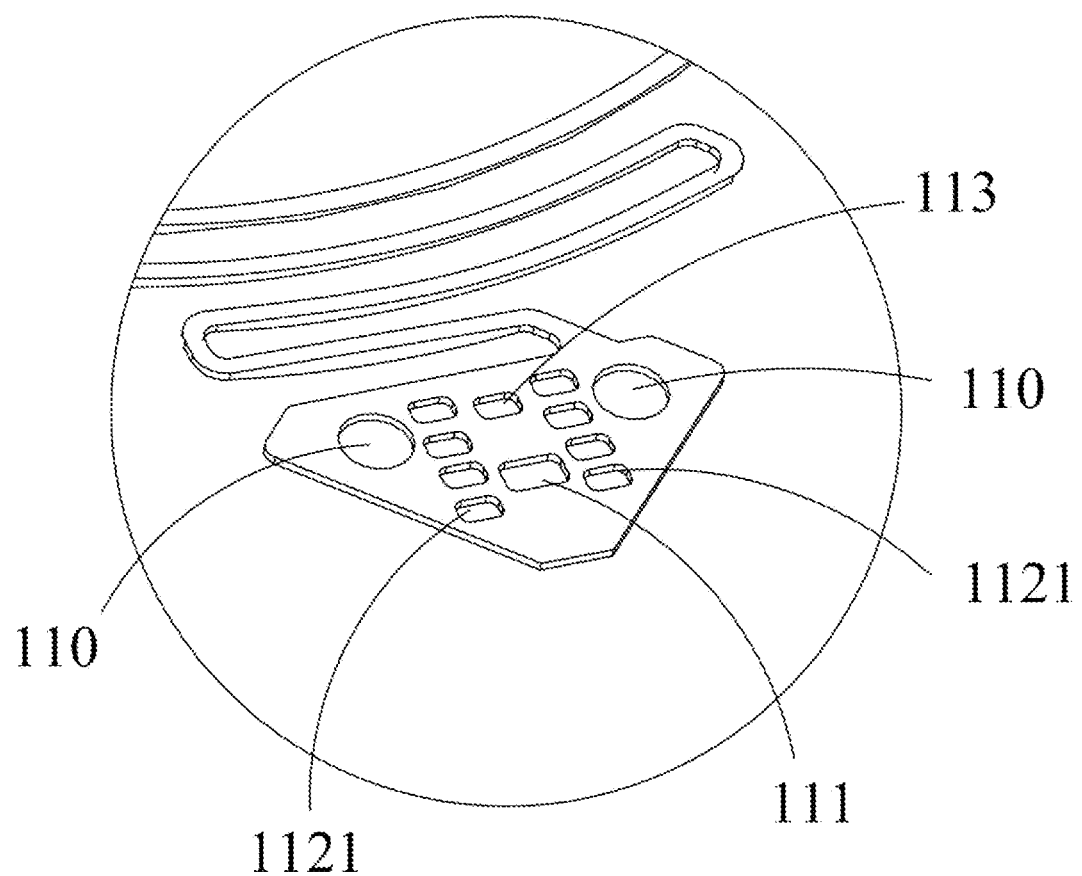
FIG. 12 is a schematic diagram of the lower elastic piece according to a yet embodiment of the present disclosure.
Figure 13:
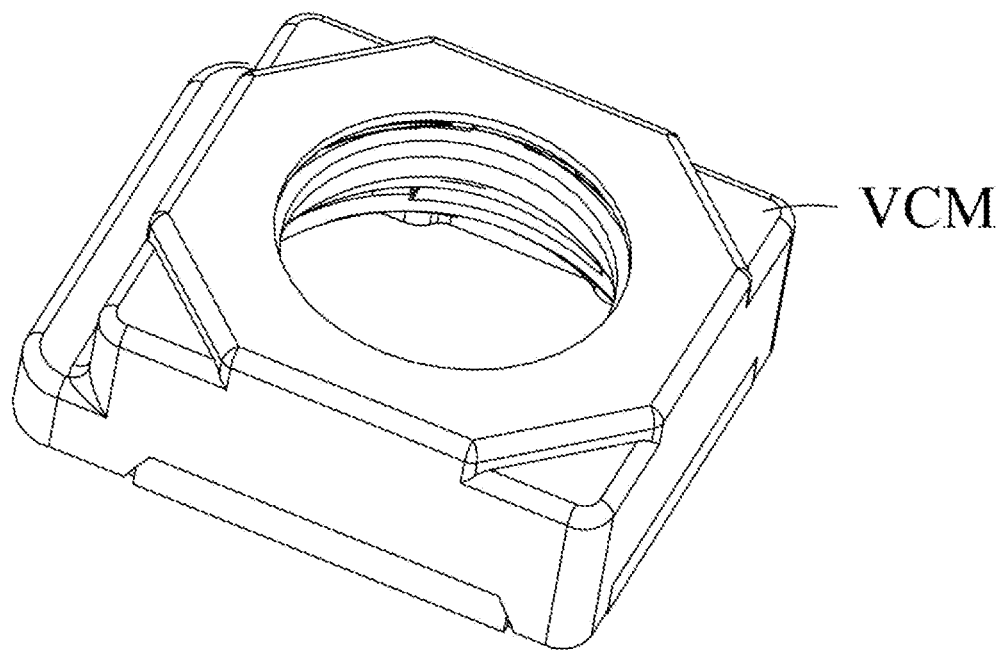
FIG. 13 is a schematic diagram of the voice coil motor according to an embodiment of the present disclosure.
Figure 14:
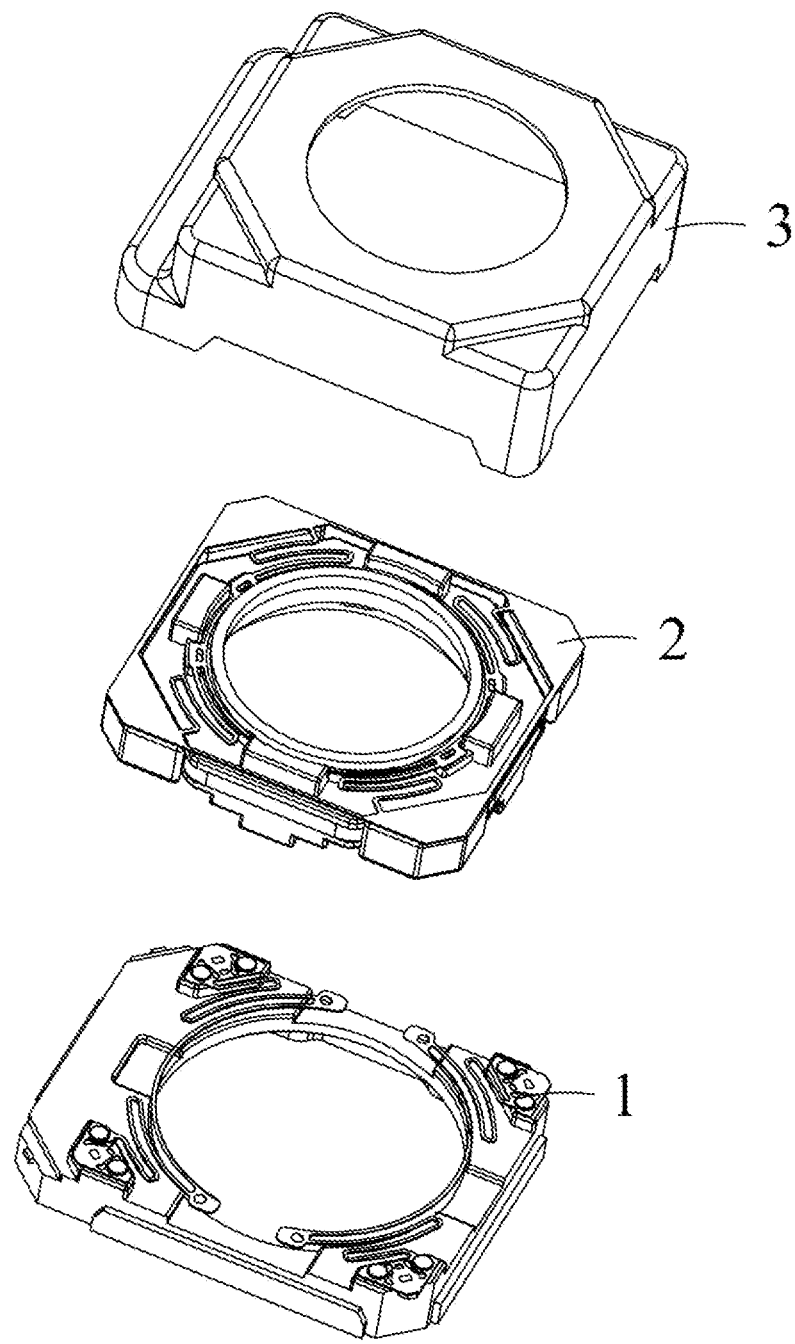
FIG. 14 is an exploded diagram of the voice coil motor according to an embodiment of the present disclosure.
Figure 15:
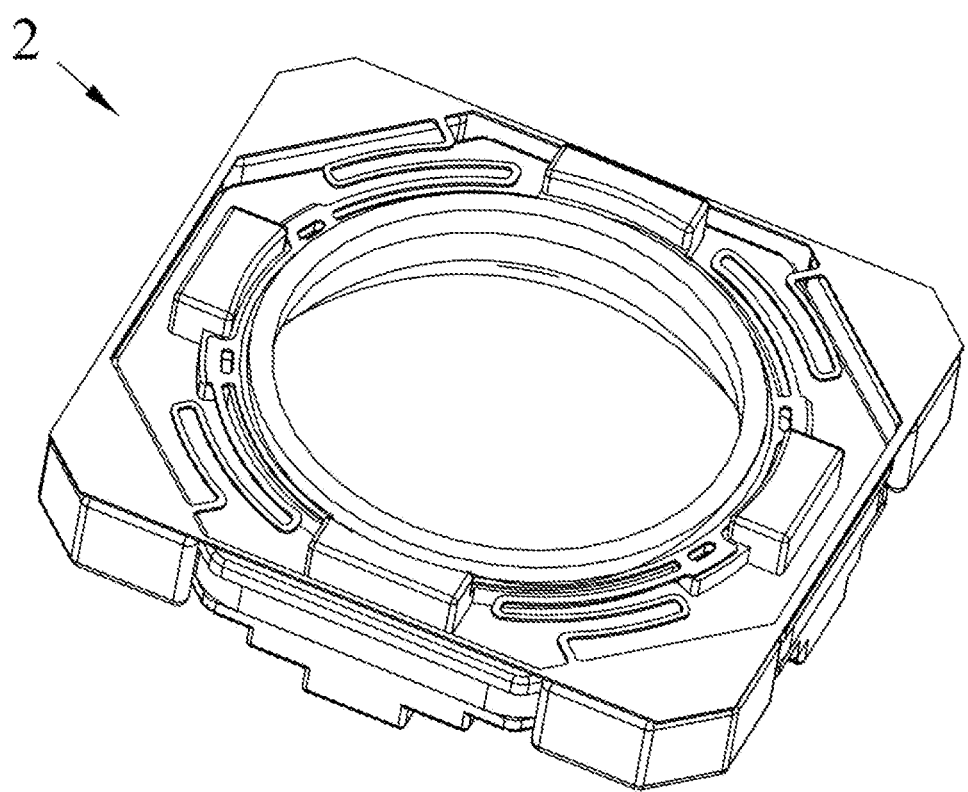
FIG. 15 is a schematic diagram of the coil assembly according to an embodiment of the present disclosure.
Figure 16:
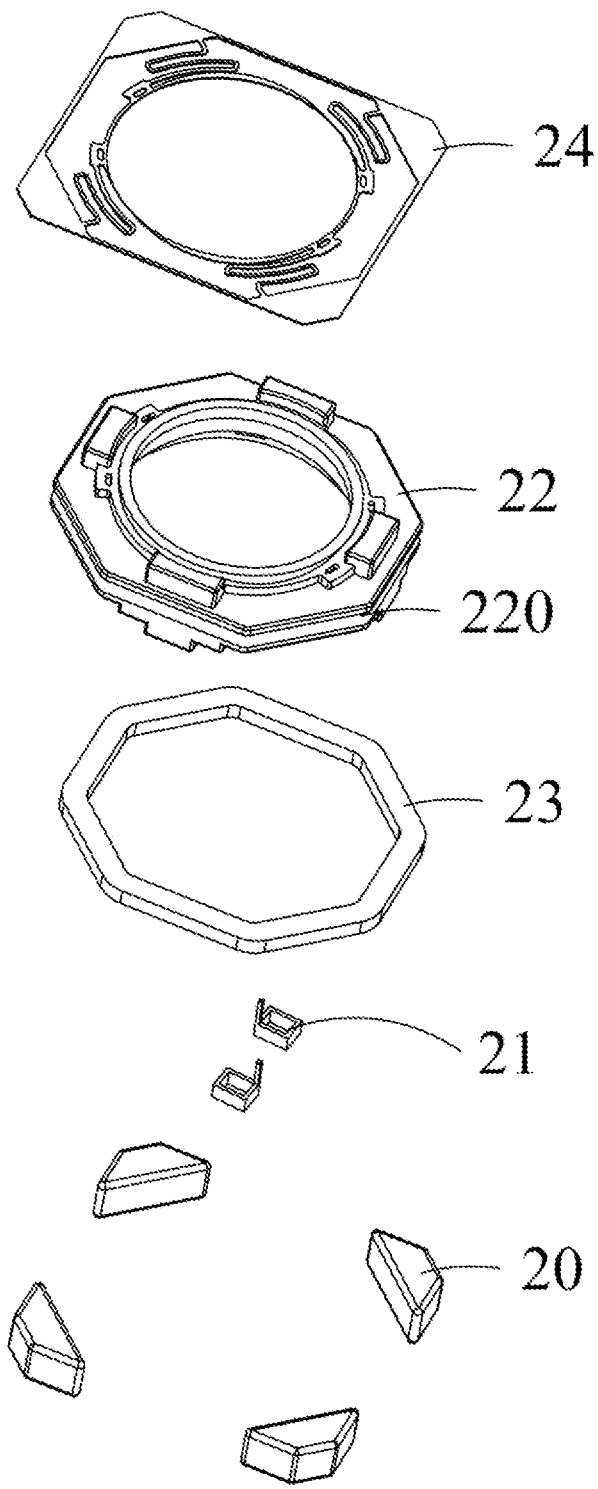
FIG. 16 is an exploded diagram of the coil assembly according to an embodiment of the present disclosure.

FIG. 12 is a schematic diagram of a lower elastic piece according to a yet embodiment according to the present disclosure. As shown in the figure, in some embodiments, the first trench 112 may include a plurality of first sub-trench 1121, and the plurality of first sub-trench 1121 are spaced apart from each other and are disposed between the first connecting hole 110 and the second connection hole 111. That is, the effect of reducing the rigidity of the lower elastic piece 11 may also be achieved through the plurality of first sub-trench 1121 shown in FIG. 12.

It should be noted that the various aspects listed above are only examples, and the shape of the first trench or the first sub-trench is not limited thereto. More specifically, the concept of the present disclosure is to reduce the rigidity of the lower elastic piece 11 by the trench. That is, any trench that helps to reduce the rigidity of the lower elastic piece 11 should fall within the protection scope of the present disclosure.

In the hereinbefore, the detailed features of the lower elastic piece 11 have been explained through different embodiments. Therefore, in the hereinafter, other components and elements will be explained in detail to make the entire base assembly and the voice coil motor more complete and easier to understand.

Figure 7:
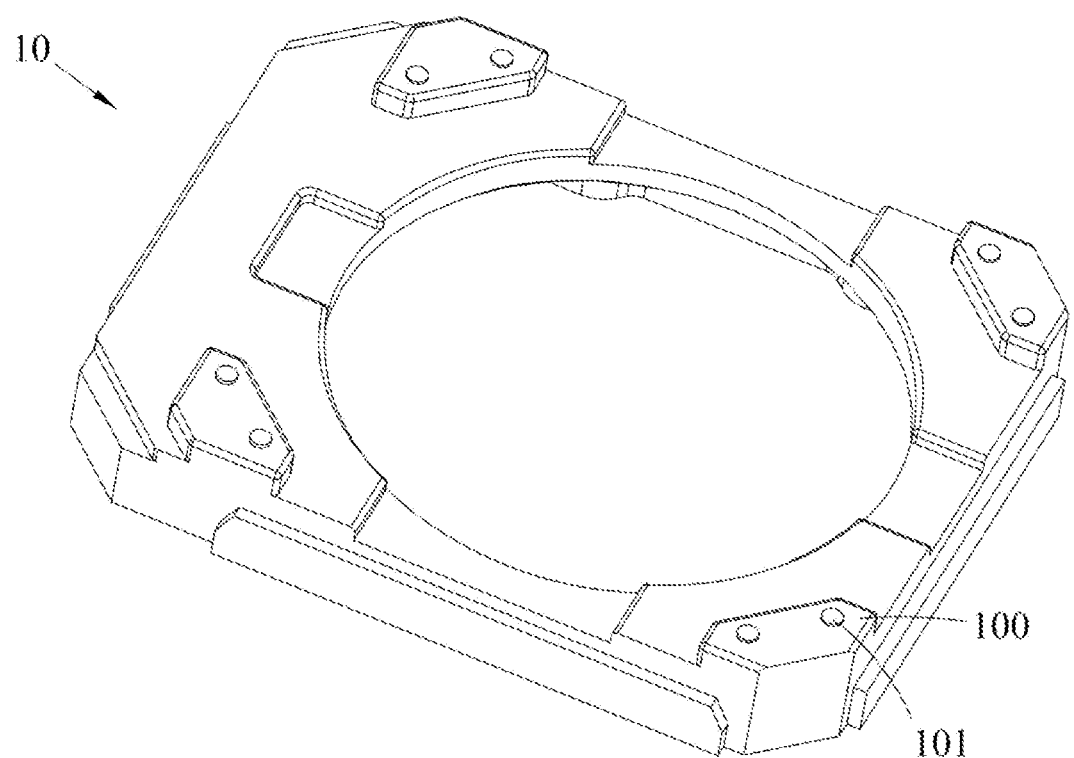
FIG. 7 is a schematic diagram of the base body according to an embodiment of the present disclosure.

As shown in FIG. 7 and FIG. 8. In some embodiments, the number of protrusions 101 on the elastic piece connecting area 100 is two, and the two protrusions 101 are on both sides of the elastic piece connecting area 100. The number of the first connecting holes 110 of the lower elastic piece 11 is also two, and the two connecting holes 110 correspond to the two protrusions 101 respectively. The number of the first trenches 112 is two, and the two first trenches 112 are respectively disposed on both sides of the terminal connecting part 131. In this way, by disposing the protrusions 101, the first connecting holes 110, and the first trenches 112 on both sides of the elastic piece connecting area 100 and the lower elastic piece 11, respectively, the lower elastic piece 11 may be uniformly attached to the elastic piece connecting area 100. Therefore, warping of one side of the lower elastic piece 11 during the hot riveting process may be avoided.

As shown in FIG. 7 and FIG. 8. In some embodiments, the number of elastic piece connecting areas 100 may be four, and the four elastic piece connecting areas 100 are respectively at the four corners of the base body 10. The number of lower elastic pieces 11 is two, and each of the lower elastic pieces 11 includes the elastic piece connecting part 11A and two lower elastic piece parts 11B at both ends of the elastic piece connecting part 11A. Wherein, the four lower elastic piece parts 11B are respectively disposed on the four elastic piece connecting areas 100, and each of the lower elastic piece parts 11B has a first connecting hole 110, a second connecting hole 111, and a first trench 112. Furthermore, the elastic piece connecting part 11A of the lower elastic piece 11 is used to connect a lens. When the lens moves, the jitter or vibration from the lens may be absorbed through the elastic piece connecting part 11A, and the lens is stabilized by the entire lower elastic piece 11. On the other hand, the lower elastic piece part 11B is used to connect the elastic piece connecting area 100, and the related details thereof are as described above, so the description is omitted.

FIGS. 13 to 16 are respectively a schematic diagram and an exploded diagram of the voice coil motor, and a schematic diagram and an exploded diagram of the coil assembly according to an embodiment of the present disclosure. As shown in the figure, a voice coil motor VCM includes the base assembly 1 and a coil assembly 2. In the present embodiment, the base assembly 1 may be similar or the same as the base assembly 1 in the embodiment mentioned above, so the description thereof is omitted.

The coil assembly 2 is disposed on the base assembly 1 and includes a magnet 20, a conductive pillar 21, a frame 22, a coil 23, and an upper elastic piece 24. The magnet 20 is disposed on the first elastic piece connecting area 100. The conductive pillar 21 is electrically connected to the lower elastic piece 11. For example, one side of the conductive pillar 21 is soldered or welded to the elastic piece connecting part 11A. The frame 22 is disposed on the base body 10, and the frame 22 is recessed to form an annular groove 220. The coil 23 is disposed in the annular groove 220 and is electrically connected to the conductive pillar 21. For example, the other side of the conductive pillar 21 extends to contact the coil 23. The coil 23 is electrically connected to the terminal 13 through the conductive pillar 21 and the lower elastic piece 11. The upper elastic piece 24 is disposed on the frame 22.

In some embodiments, the voice coil motor VCM further includes a case 3 covering the base assembly 1 and the coil assembly 2. The case 3 is used to prevent the base assembly 1 and the coil assembly 2 from water or dust. Therefore, the reduction of the life of the components may be avoided.

Figure 9:
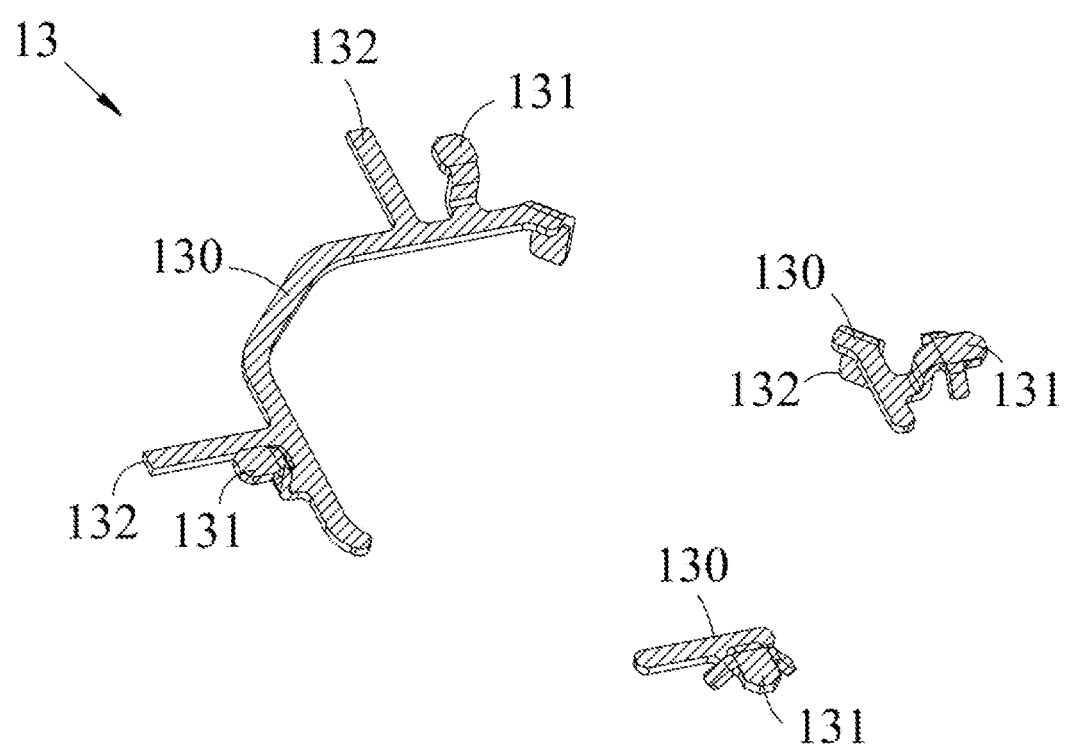
FIG. 9 is a schematic diagram of the terminal according to an embodiment according to the present disclosure.

As shown in FIG. 9. In some embodiments, the terminal 13 may have an input/output end 132. The coil 23, the conductive pillar 21, the lower elastic piece 11, and the terminal 13 form a loop with the power supply through the input/output end 132, so as to cooperate with the magnet 20 to move a lens (not shown) at the center of the voice coil motor VCM. In other words, the current enters the coil 23 from the input/output ends 132 of the terminal 13 along the lower elastic piece 11 and the conductive pillar 21 to form an electric field. A magnetic field generated by the electric field mentioned above may interact with the magnet 20 and move the lens at the center of the voice coil motor VCM.

In summary, the lower elastic piece has a first trench, and an area of the lower elastic piece may be reduced by the first trench. In material mechanics, the rigidity of the element is determined by the size of the area thereof. In other words, a decrease in the area of the lower elastic piece represents a decrease in the rigidity of the lower elastic piece. In this way, when the connecting piece is pressed against the lower elastic piece, a gap area and a gap distance between the lower elastic piece and the connecting area of the elastic piece are further reduced, therefore the precision of the coil motor is improved.

A person of ordinary skill in the art will understand current and future manufacturing processes, method and step from the content disclosed in some embodiments of the present disclosure, as long as the current or future manufacturing processes, method, and step performs substantially the same functions or obtain substantially the same results as the present disclosure. Therefore, the scope of the present disclosure includes the above-mentioned manufacturing process, method, and steps.

The above descriptions are only examples of this application and are not intended to limit this application. This disclosure may have various modifications and changes for a person of ordinary skill in the art. Any modification, equivalent replacement, improvement, etc. made within the spirit and principle of this application shall be included in the scope of the claims of this disclosure.

What is claimed is:
1. A base assembly of a voice coil motor, comprising:
a base body having an elastic piece connecting area, wherein the elastic piece connecting area has a protrusion;
a lower elastic piece disposed on the elastic piece connecting area, wherein the lower elastic piece has a first connecting hole, a second connecting hole, and a first trench, a shape of the first connecting hole is circular, the protrusion passes through the first connecting hole, the first trench is disposed between the first connecting hole and the second connecting hole, and a long side of the first trench extends along the shape of the first connecting hole;
a connecting piece connected to the protrusion and contacting with the lower elastic piece; and
a terminal having a conductive part and a terminal connecting part, wherein the conductive part is disposed in the base body, the terminal connecting part passes through the elastic piece connecting area and protrudes from the elastic piece connecting area, and a part of the terminal connecting part is exposed from the second connecting hole to be fixedly connected to the lower elastic piece;
wherein the connecting piece presses against the lower elastic piece to make an area of the lower elastic piece adjacent to the connecting piece bended based on the first trench and steadily attached on the elastic piece connecting area, to reduce a gap area and a gap distance between the lower elastic piece and the elastic piece connecting area;

wherein the first trench comprises two first sub-trenches, and the two first sub-trenches are formed by being recessed from sidewalls of the lower elastic piece respectively.

2. The base assembly of voice coil motor according to claim 1, wherein the lower elastic piece further comprises a second trench, and the second trench is disposed between a side of the second connecting hole and a center of the base body.

3. The base assembly of voice coil motor according to claim 1, wherein
the elastic piece connecting area is provided in four, and the four elastic piece connecting areas respectively are at four corners of the base body;
the lower elastic piece is provided in two, and each of the lower elastic pieces comprises an elastic piece connecting part and two lower elastic piece parts at both ends of the elastic piece connecting part;
wherein, the four lower elastic piece parts are correspondingly disposed on the four elastic piece connecting areas, respectively, and each of the lower elastic piece parts has the first connecting hole, the second connecting hole, and the first trench.

4. The base assembly of voice coil motor according to claim 1, wherein
the protrusion on the elastic piece connecting area is provided in two, and the two protrusions are on two sides of the terminal connecting part;
the first connecting hole of the lower elastic piece is provided in two; and
the first trench is provided in two, and the two first trenches are respectively disposed on two sides of the terminal connecting part.

5. The base assembly of voice coil motor according to claim 1, wherein a shape of the first trench is an arc extending along the first connecting hole.

6. The base assembly of voice coil motor according to claim 1, wherein the lower elastic piece comprises an elastic piece connecting part and a lower elastic piece part at one end of the elastic piece connecting part, the lower elastic piece part is correspondingly disposed on the elastic piece connecting area, the lower elastic piece part comprises a fixing portion, an electrically connecting portion, and a low rigidity portion, the low rigidity portion is disposed between the fixing portion and the electrical connecting portion, the first connecting hole is disposed in the fixing portion, the second connecting hole is disposed in the electrically connecting portion, the first trench is disposed in the low rigidity portion, and the connecting piece presses against the lower elastic piece to make the low rigidity portion bended based on the first trench.

7. A voice coil motor, comprising:
the base assembly according to claim 1; and
a coil assembly disposed on the base assembly, wherein the coil assembly comprises:
a magnet disposed on the elastic piece connecting area;
a conductive pillar electrically connected to the lower elastic piece;
a frame disposed on the base body, wherein the frame is recessed to form an annular groove;
a coil disposed in the annular groove, wherein the coil is electrically connected to the conductive pillar; and
an upper elastic piece disposed on the frame.

8. The voice coil motor according to claim 7, further comprising a case covering the base assembly and the coil assembly.

9. The voice coil motor according to claim 7, wherein the terminal further has an input/output end, wherein the coil, the conductive pillar, the lower elastic piece, and the terminal form a loop with a power supply through the input/output end.

10. The voice coil motor according to claim 7, wherein the lower elastic piece further comprises a second trench, and the second trench is disposed between a side of the second connecting hole and a center of the base body.

11. The voice coil motor according to claim 7, wherein
the elastic piece connecting area is provided in four, and the four elastic piece connecting areas respectively are at four corners of the base body;
the lower elastic piece is provided in two, and each of the lower elastic pieces comprises an elastic piece connecting part and two lower elastic piece parts at both ends of the elastic piece connecting part;
wherein, the four lower elastic piece parts are correspondingly disposed on the four elastic piece connecting areas, respectively, and each of the lower elastic piece parts has the first connecting hole, the second connecting hole, and the first trench.

12. The voice coil motor according to claim 7, wherein
the protrusion on the elastic piece connecting area is provided in two, and the two protrusions are on two sides of the terminal connecting part;
the first connecting hole of the lower elastic piece is provided in two; and
the first trench is provided in two, and the two first trenches are respectively disposed on two sides of the terminal connecting part.

13. The voice coil motor according to claim 7, wherein a shape of the first trench is an arc extending along the first connecting hole.

14. The voice coil motor according to claim 7, wherein the lower elastic piece comprises an elastic piece connecting part and a lower elastic piece part at one end of the elastic piece connecting part, the lower elastic piece part is correspondingly disposed on the elastic piece connecting area, the lower elastic piece part comprises a fixing portion, an electrically connecting portion, and a low rigidity portion, the low rigidity portion is disposed between the fixing portion and the electrical connecting portion, the first connecting hole is disposed in the fixing portion, the second connecting hole is disposed in the electrically connecting portion, the first trench is disposed in the low rigidity portion, and the connecting piece presses against the lower elastic piece to make the low rigidity portion bended based on the first trench.

15. A method for producing a base assembly of a voice coil motor, comprising the following steps:
(a) providing a base body, a lower elastic piece, a connecting piece, and a terminal, the base body having an elastic piece connecting area with a protrusion, the lower elastic piece having a first connecting hole, a second connecting hole, and a first trench, a shape of the first connecting hole is circular, a long side of the first trench extends along the shape of the first connecting hole, the first trench being disposed between the first connecting hole and the second connecting hole, the terminal having a conductive part and a terminal connecting part, the conductive part being in the base body, the terminal connecting part passing through the elastic piece connecting area and protruding from the elastic piece connecting area, a part of the terminal connecting part being exposed from the second connecting hole;

(b) disposing the lower elastic piece on the elastic piece connecting area to make the protrusion pass through the first connecting hole;

(c) connecting the connecting piece to the protrusion to make the connecting piece presses against the lower elastic piece and bend an area of the lower elastic piece adjacent to the connecting piece based on the first trench, so that the area of the lower elastic piece adjacent to the connecting piece is steadily attached on the elastic piece connecting area, to reduce a gap area and a gap distance between the lower elastic piece and the elastic piece connecting area; and (d) fixedly connecting the part of the terminal connecting part, which is exposed from the second connecting hole, to the lower elastic piece.

16. The method according to claim 15, wherein the first trench comprises two first sub-trenches, and the two first sub-trenches are formed by being recessed from sidewalls of the lower elastic piece respectively.

17. The method according to claim 15, wherein the lower elastic piece comprises an elastic piece connecting part and a lower elastic piece part at one end of the elastic piece connecting part, the lower elastic piece part comprises a fixing portion, an electrically connecting portion, and a low rigidity portion, the low rigidity portion is disposed between the fixing portion and the electrical connecting portion; step (b) comprises: disposing the first connecting hole in the fixing portion; disposing the second connecting hole in the electrically connecting portion; and disposing the first trench in the low rigidity portion; step (c) comprises: connecting the connecting piece to the protrusion to make the connecting piece presses against the lower elastic piece and bend the low rigidity portion based on the first trench.

* * * * *